July 14, 1931. W. C. WHITE 1,814,103
ELECTRICALLY HEATED COOKER
Filed Oct. 3, 1927 5 Sheets-Sheet 1
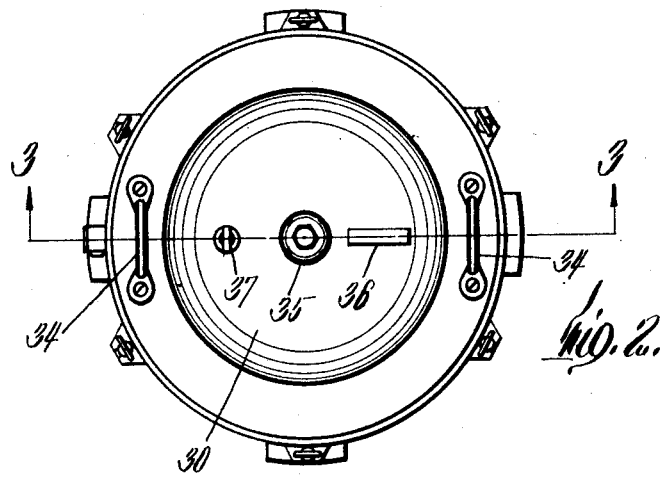
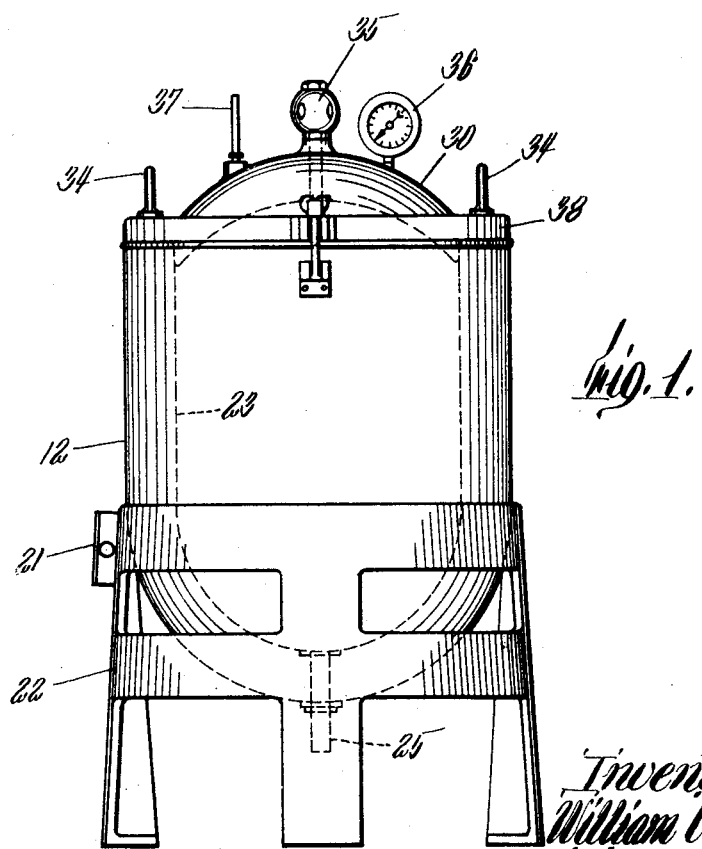

July 14, 1931.  W. C. WHITE  1,814,103

ELECTRICALLY HEATED COOKER

Filed Oct. 3, 1927  5 Sheets-Sheet 2

Inventor
William C. White
by Wright, Brown, Quinby & May
Attys

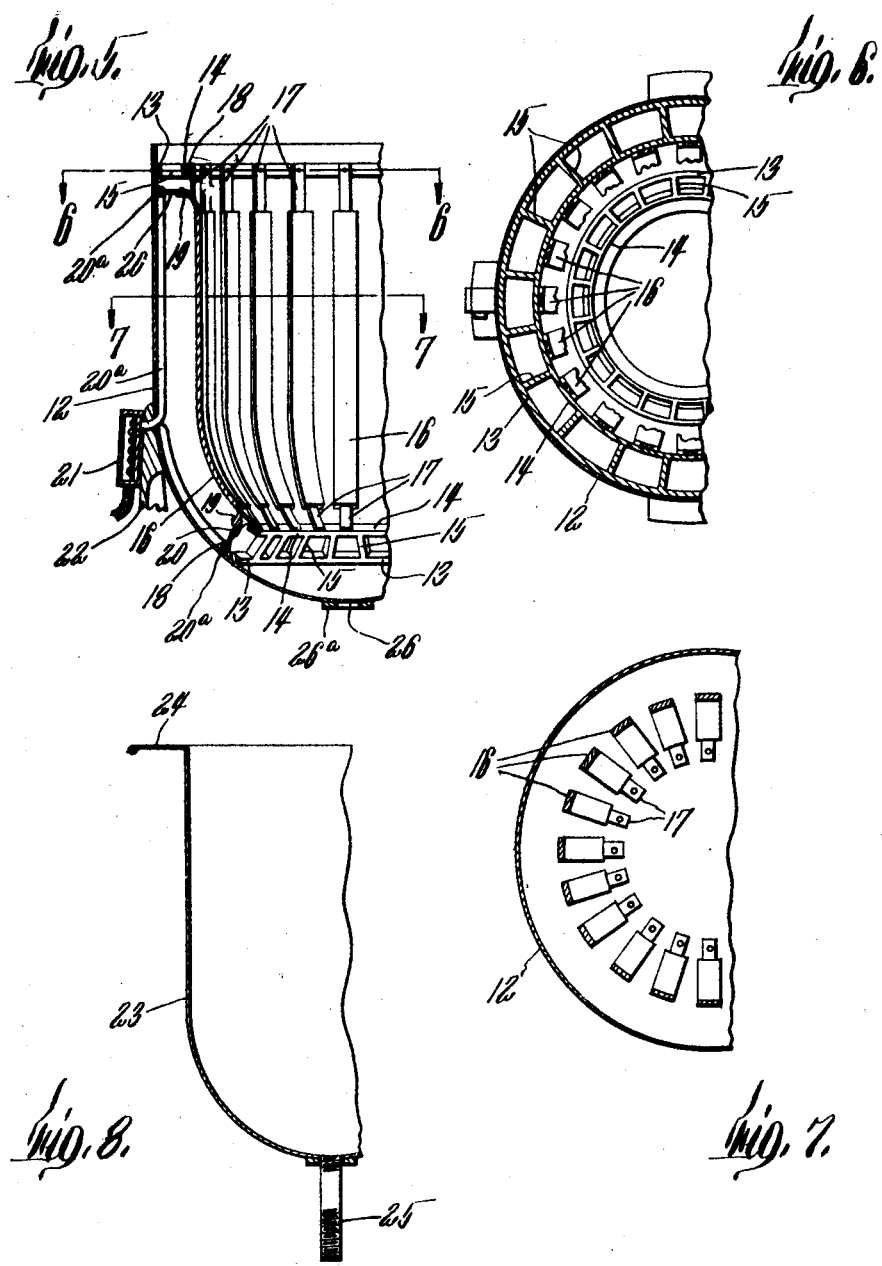

July 14, 1931.  W. C. WHITE  1,814,103
ELECTRICALLY HEATED COOKER
Filed Oct. 3, 1927  5 Sheets-Sheet 5
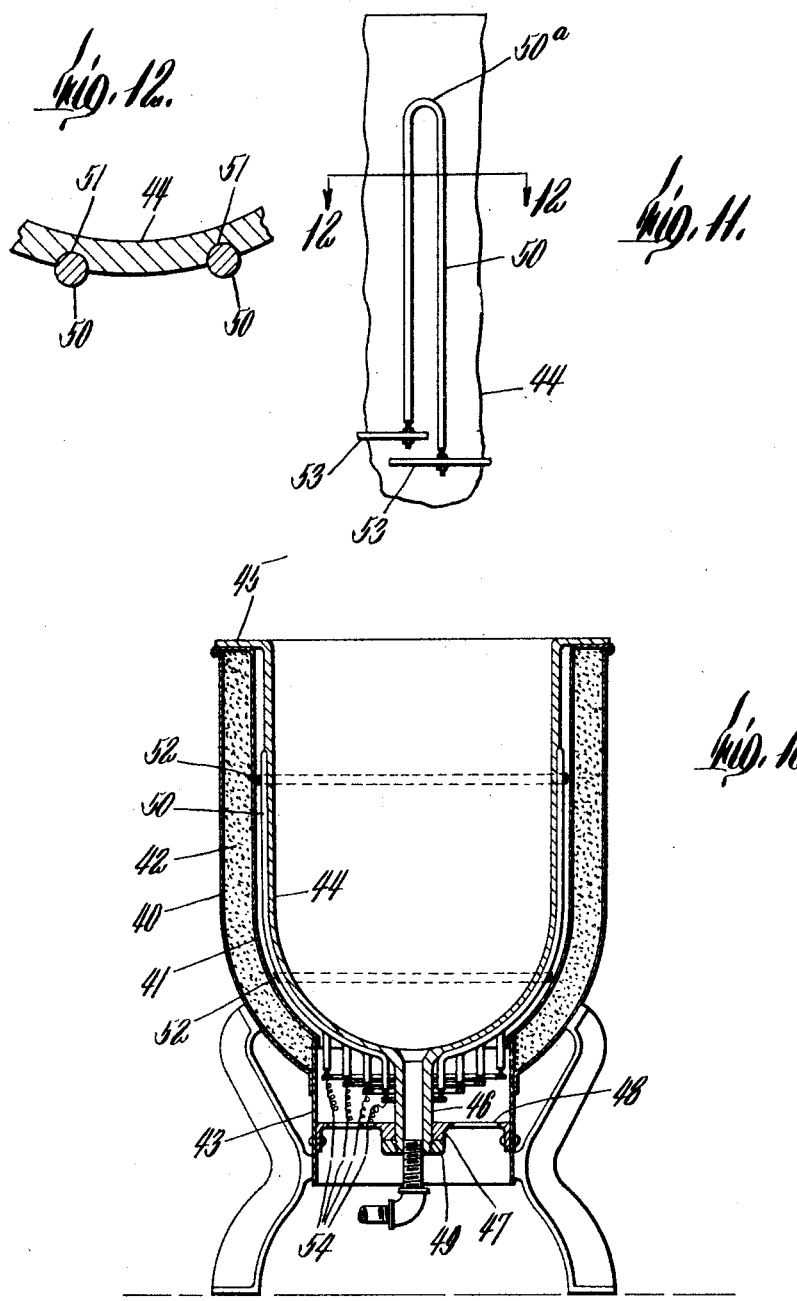
Inventor
William C. White Patented July 14, 1931

1,814,103

UNITED STATES PATENT OFFICE

WILLIAM C. WHITE, OF PORTLAND, MAINE, ASSIGNOR TO INDUSTRIAL DEVELOPMENT & MANUFACTURING CORPORATION, OF PORTLAND, MAINE, A CORPORATION OF MAINE

ELECTRICALLY HEATED COOKER

Application filed October 3, 1927. Serial No. 223,576.

This invention relates to an electrically heated cooker, which includes a kettle, a jacket surrounding and spaced from the kettle, and electrical heating units located in the space between the kettle and jacket to heat the kettle.

One object of the invention is to provide a cooker in which the heating units are in direct contact with the kettle and adapted to quickly and effectively heat the latter.

Another object is to provide a cooker, the kettle and jacket elements of which are separable, and the heating units are readily accessible when said elements are separated.

Another object is to provide a cooker, the heating units of which form members of a cage fixed within the jacket, the kettle being removably supported by the cage in heating relation to the heating units and spaced from the jacket, the arrangement being such that when the kettle is removed, free access to the heating units is permitted.

Other objects will appear hereinafter.

Of the accompanying drawings forming a part of this specification—

Figure 1 is a side elevation of a cooker constituting one embodiment of the invention.

Figure 2 is a top plan view of the same.

Figure 5 is a fragmentary sectional view, showing a portion of the jacket.

Figure 6 is a section on line 6—6 of Figure 5.

Figure 7 is a section on line 7—7 of Figure 5.

Figure 8 is a fragmentary view, showing a portion of the kettle.

Figure 10 is a view similar to Figure 3, showing another embodiment of the invention.

Figure 11 is a fragmentary side view of a portion of the kettle and one of the heating units shown by Figure 10.

Figure 12 is an enlarged section on line 12—12 of Figure 11.

The same reference characters indicate the same parts in all of the figures.

Figure 4:
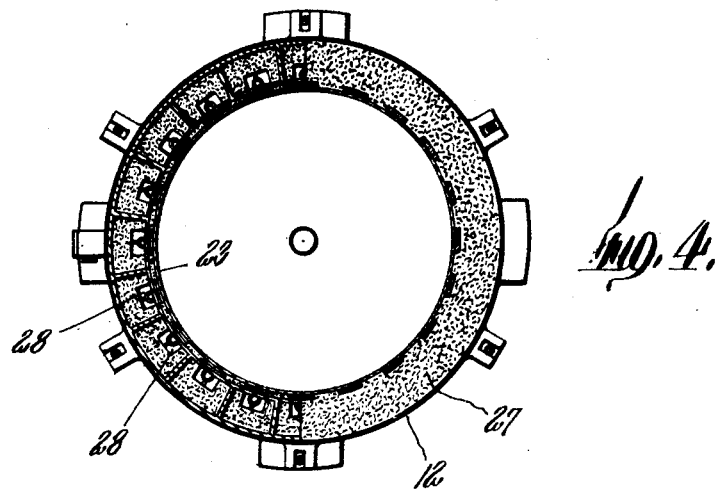
Figure 4 is a section on the planes indicated by the line 4—4 of Figure 3.

I will first describe the embodiment shown by Figures 1 to 8, inclusive.

12 designates a jacket, the upper portion of which is preferably cylindrical, and the bottom substantially hemispherical. Fixed to the packet 12 are upper and lower supporting members, projecting inwardly from the inner surface of the jacket. Each supporting member is preferably a unitary annular structure including an outer ring 13, fixed as by riveting, electric welding, or otherwise, to the jacket, an inner ring 14, and radial arms 15, connecting the rings and spacing the inner from the outer ring, as best shown by Figures 5 and 6, so that the inner ring is spaced inwardly from the jacket. In this instance, the lower supporting member is fixed to the bottom portion of the jacket and has the dished form shown at the lower portion of Figure 5.

Fixed to and extending between the upper and lower supporting members are heating or resistance units or elements 16, which may be of any suitable construction and material, and may be elongated strips, either round, square, or oblong in cross section, or wires wound on strips of insulating material.

Each unit 16 is mechanically connected at its opposite ends with the supporting members by any suitable means, as by end strips 17, fixed to the inner rings 14, and insulated therefrom by interposed insulation 18 (Figure 5). The units 16 are offset by the supporting members from the inner surface of the jacket and constitute, with said members, a supporting cage within the jacket, said cage being contracted at its lower end, as shown by Figure 5.

The units are provided with conducting terminals 19, which are electrically connected with terminals 20 of lead wires, included in a heating circuit, said wires being grouped in tubular sheaths, the wires and sheaths forming cables 20a extending through the jacket wall into a connection box 21, in which the connections are made. The connection box may be supported by a base 22

(Figure 1) adapted to support the cooker above a floor.

Figure 3:
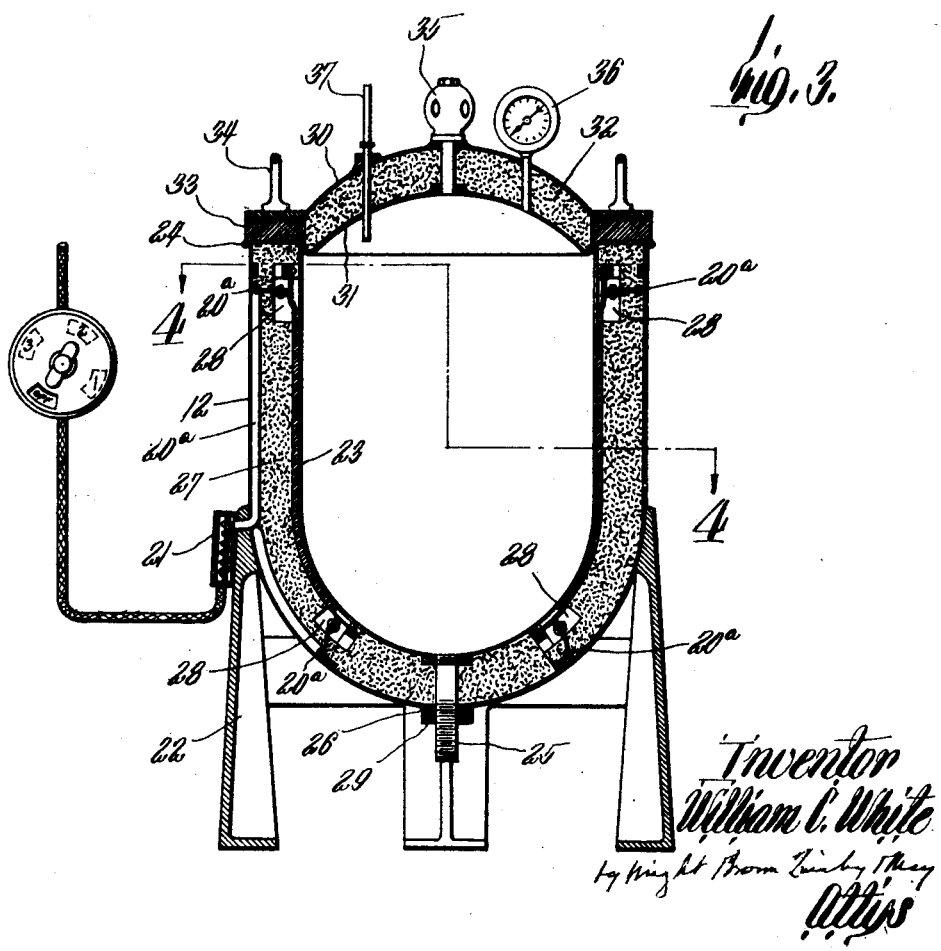
Figure 3 is a vertical section.

23 designates the kettle, which is formed like and is smaller than the jacket, its external form being such that it is adapted to be supported by the cage formed by the supporting members above described, and the heating units 16. The kettle 23 is removably inserted in the cage, so that its outer surface is in direct contact with the units 16. The mouth of the kettle is surrounded by an outwardly projecting flange 24, bearing removably an annular seat formed by the top of the jacket, as shown by Figure 3. To the bottom of the kettle is fixed a drain pipe 25, adapted to enter an orifice 26 (Figure 5) in the bottom of the jacket. The orifice 26 is surrounded by a downwardly facing seat 26a and the drain pipe is externally threaded and provided with a nut 29 adapted to be set up against the seat 26a and detachably secure the kettle to the jacket.

When the kettle is removed, the heating units 16 and their connections are exposed, so that they may be conveniently repaired and renewed.

27 designates a lining, of any suitable heat-insulating material, which is a nonconductor of heat and electricity, molded on the inner surface of the jacket, and backing the heating units 16, to confine the same in operative relation to the kettle. Said lining is provided with recesses 28, in its inner surface, forming working spaces at opposite ends of the heating units into which the terminals 19 and 20 extend, so that said terminals may be conveniently connected and disconnected in said spaces when the kettle is removed.

The kettle is provided with a cover which, in this instance, includes an outer shell 30 and an inner shell 31, and a filling 32 of heat-insulating material. The margin of the cover is seated on the flange 24 of the kettle, and may include an annular weight 33, adapted to hold down the cover against relatively low pressure in the kettle. If desired, the cover may be positively confined by clamps of well known construction. The cover, indicated at 38 (Figures 1 and 2), may be provided with handles 34, a relief valve 35, a pressure gauge 36, and a thermometer 37.

I will now describe the embodiment shown by Figures 10, 11 and 12, in which the heating units are attached to the kettle and are removable therewith from the jacket.

In this embodiment the jacket includes an outer shell 40, an inner shell 41, and heat insulating material 42 between the shells. The bottom of the jacket has an opening from which a tubular shell portion 43 projects downwardly. The kettle 44 has an outwardly projecting annular flange 45 at its top bearing removably on an annular seat formed by the top of the jacket, and a drain pipe 46 extending downwardly through a seat 47 fixed to the jacket preferably by spider arms 48 connecting the seat with the tubular shell portion 43. The drain pipe is externally threaded and provided with a nut 49 which is set up against the seat 47 to detachably secure the kettle to the jacket.

Each of the heating units 50, of which there may be any desired number, is circular in cross section and has the inverted U-shape shown by Figure 11. The external surface of the kettle 44 is provided with grooves 51 (Figure 12) fitting the inner sides of the heating units 50. The units are confined against the external surface of the kettle by hoops 52. The neck 50a of each unit bears on the neck portion of the corresponding groove 51 to prevent downward displacement of the unit. One leg of each unit is longer than the other as shown by Figure 11, and the extremities of said legs are bent to extend vertically and fixed to horizontal rings 53 of different diameters and surrounding the outlet pipe 46, as indicated by Figure 10. The lead wires included in the heating circuit and designated by 54 are connected with the rings and with the ends of the units as indicated by Figure 10, and extend through the tubular shell portion 43. When the nut 49 is removed, the kettle, the heating units attached thereto, and the rings 53 are removable from the jacket so that the units are exposed and accessible.

Figure 9:
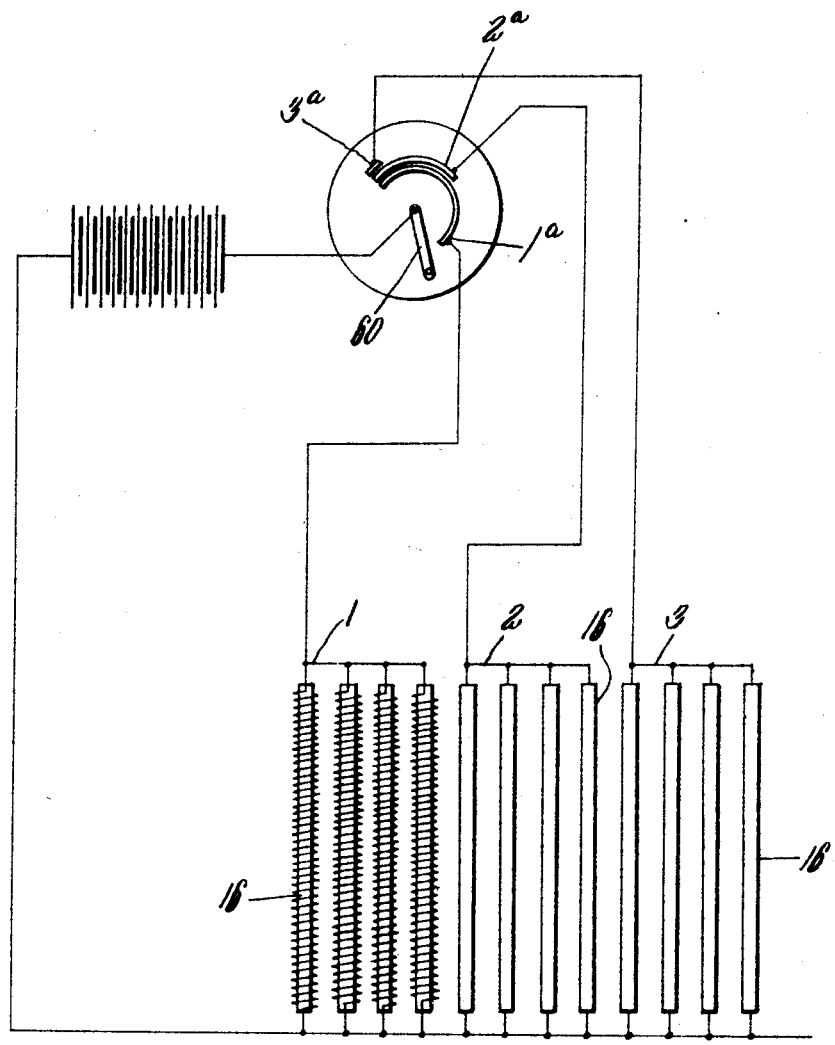
Figure 9 is a diagrammatic view.

I prefer to electrically connect the heating units of each embodiment of the invention in groups of which there may be any suitable number, three being shown diagrammatically in Figure 9, these being designated respectively by 1, 2 and 3. The heating circuit includes a switch, including a revoluble arm 38, and conduits 1a, 2a and 3a, the wiring being as shown by Figure 9. When the switch arm touches only the contact 1a the circuit is closed through the units of group 1 only. When the switch arm touches the contacts 1a and 2a the circuit is closed through the units of groups 1 and 2, and when the switch arm touches the contacts 1a, 2a and 3a the circuit is closed through each of the groups. Different cooking temperatures are therefore obtainable.

I claim:

1. An electrically heated cooker, comprising a kettle having an externally threaded drain pipe fixed to and projecting downward from its bottom, and an outwardly projecting flange at its top, a jacket surrounding and spaced from the kettle, the top of the jacket having an annular seat for the kettle flange, heating units contacting with the external surface of the kettle, said units being included in an electric heating circuit which includes leads extending through the jacket wall, the jacket being provided with a downwardly facing seat apertured to receive the drain pipe, and a nut engaged with the pipe and adapted to bear on said seat and detachably secure the kettle to the jacket.

2. An electrically heated cooker, comprising a bowl-shaped jacket, upper and lower supporting members fixed to the jacket and projecting inwardly from the inner surface thereof, heating units supported by and extending between said members and offset thereby from the inner surface of the jacket, said members and heating units forming a supporting cage within the jacket, said units being included in an electric heating circuit which includes leads extending through the wall of the jacket, and a bowl-shaped kettle seated on said cage and contacting with the heating units to receive heat therefrom, the kettle being removable to expose the cage and permit renewal and repair of the heating unit elements thereof.

3. An electrically heated cooker as specified by claim 2, each of said supporting members being composed of an outer ring fixed to the jacket, an inner ring, and arms spacing said rings apart, the heating units being mechanically secured to and insulated from the inner rings.

4. An electrically heated cooker as specified by claim 2, comprising also a heat-insulating lining molded in the jacket and backing the heating units to confine the same in operative relation to the kettle, said lining having recesses in its inner surface, forming working spaces at opposite ends of the heating units, into which terminals of the heating units and the circuit leads extend, so that said terminals may be connected and disconnected in said spaces.

In testimony whereof I have affixed my signature.

WILLIAM C. WHITE.